United States Patent
Kim et al.

(10) Patent No.: US 10,912,057 B2
(45) Date of Patent: Feb. 2, 2021

(54) METHOD FOR SELECTING CONFIGURATION BASED ON UE SPEED AND DEVICE SUPPORTING THE SAME

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/629,553

(22) PCT Filed: Aug. 9, 2018

(86) PCT No.: PCT/KR2018/009059
§ 371 (c)(1),
(2) Date: Jan. 8, 2020

(87) PCT Pub. No.: WO2019/031860
PCT Pub. Date: Feb. 14, 2019

(65) Prior Publication Data
US 2020/0145958 A1    May 7, 2020

Related U.S. Application Data

(60) Provisional application No. 62/543,413, filed on Aug. 10, 2017.

(51) Int. Cl.
*H04W 24/00* (2009.01)
*H04W 64/00* (2009.01)
(Continued)

(52) U.S. Cl.
CPC ......... *H04W 64/006* (2013.01); *H04W 24/10* (2013.01); *H04W 24/02* (2013.01);
(Continued)

(58) Field of Classification Search
CPC ... H04W 64/006; H04W 24/10; H04W 36/32; H04W 36/245; H04W 36/00837
See application file for complete search history.

(56) References Cited

U.S. PATENT DOCUMENTS 9,730,090 B2    8/2017    Johansson et al.
2009/0143093 A1    6/2009    Somasundaram et al.
(Continued)

FOREIGN PATENT DOCUMENTS

EP    2661125    11/2013
WO    2010/151198    12/2010

OTHER PUBLICATIONS

PCT International Application No. PCT/KR2018/009059, International Search Report dated Nov. 12, 2018, 2 pages.

*Primary Examiner* — Barry W Taylor
(74) *Attorney, Agent, or Firm* — Lee, Hong, Degermang, Kang & Waimey

(57) ABSTRACT

Provided are a method of selecting configuration based on UE speed and a device supporting the method. According to one embodiment of the present invention, a method for selecting configuration based on UE speed in a wireless communication system includes: receiving a first configuration and a second configuration from a network; if the UE is able to measure a speed of the UE by using a global positioning system (GPS), selecting the first configuration, and scaling values in the first configuration based on the speed of the UE; and if the UE is not able to measure the speed of the UE by using the GPS, selecting the second configuration.

15 Claims, 5 Drawing Sheets

(51) Int. Cl.
*H04W 24/10* (2009.01)
*H04W 36/00* (2009.01)
*H04W 36/32* (2009.01)
*H04W 36/24* (2009.01)
*H04W 24/02* (2009.01)

(52) U.S. Cl.
CPC .... *H04W 36/00837* (2018.08); *H04W 36/245* (2013.01); *H04W 36/32* (2013.01)

(56) References Cited

U.S. PATENT DOCUMENTS

| | | | |
|---|---|---|---|
| 2011/0263262 A1 | 10/2011 | Min et al. | |
| 2013/0040692 A1* | 2/2013 | Chen | H04W 36/32 455/525 |
| 2013/0295951 A1* | 11/2013 | Mach | H04W 36/32 455/456.1 |
| 2014/0135057 A1* | 5/2014 | Lu | H04W 36/0016 455/525 |
| 2014/0274049 A1* | 9/2014 | Singh | H04W 36/0083 455/436 |
| 2015/0215831 A1* | 7/2015 | Jung | H04W 36/00837 370/332 |

* cited by examiner

[Fig. 1]
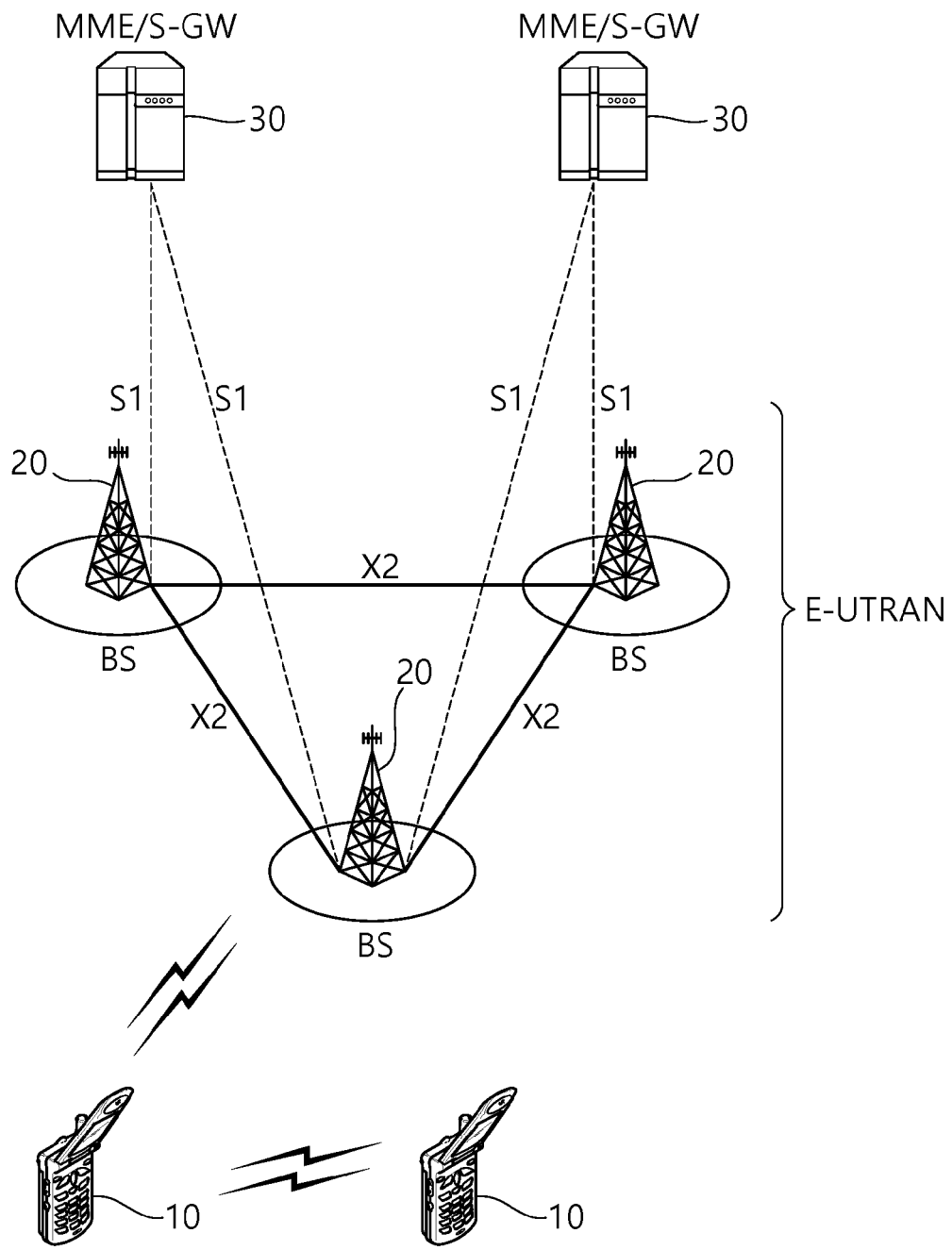

[Fig. 2]
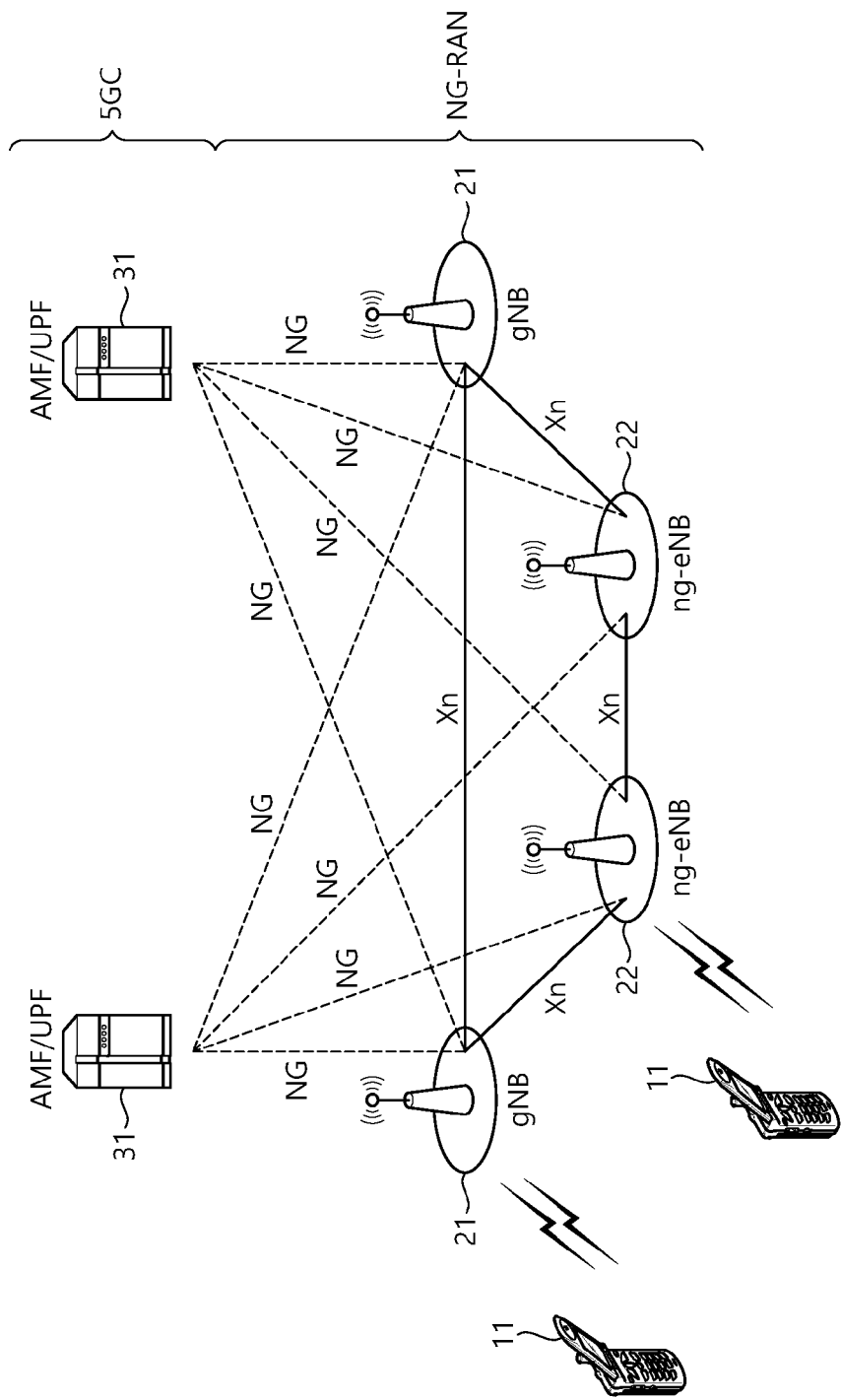

[Fig. 3]
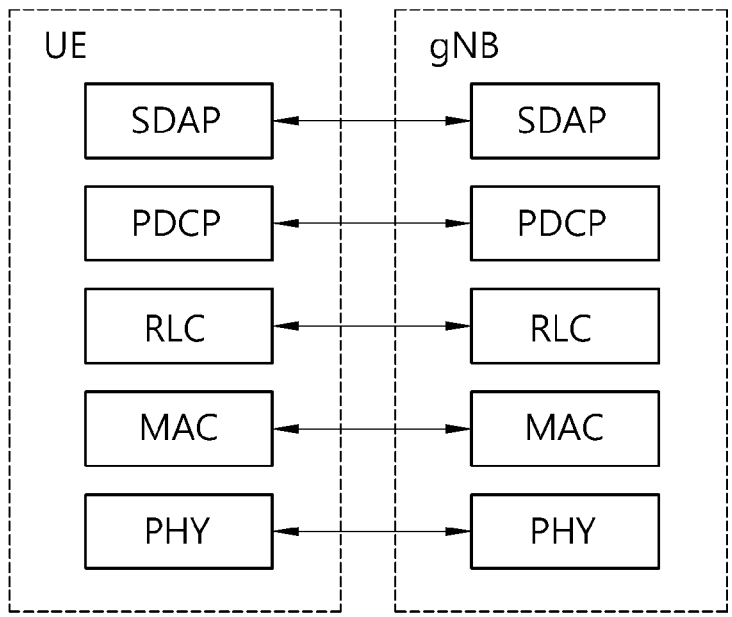
[Fig. 4]
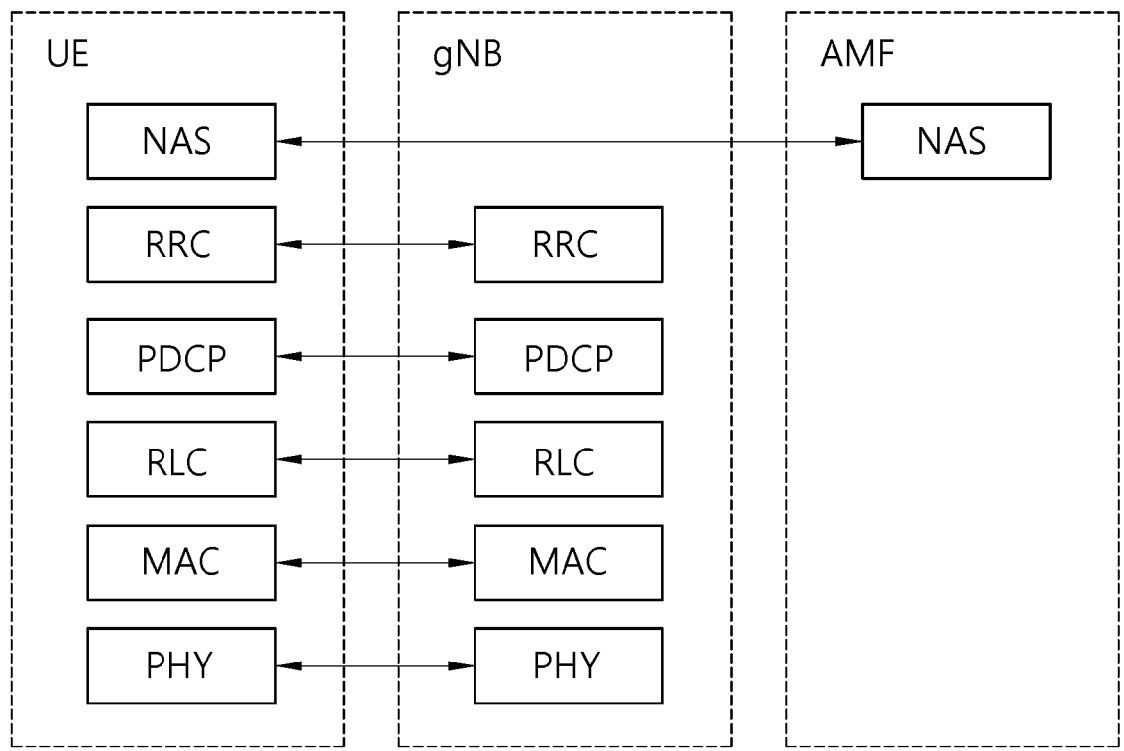

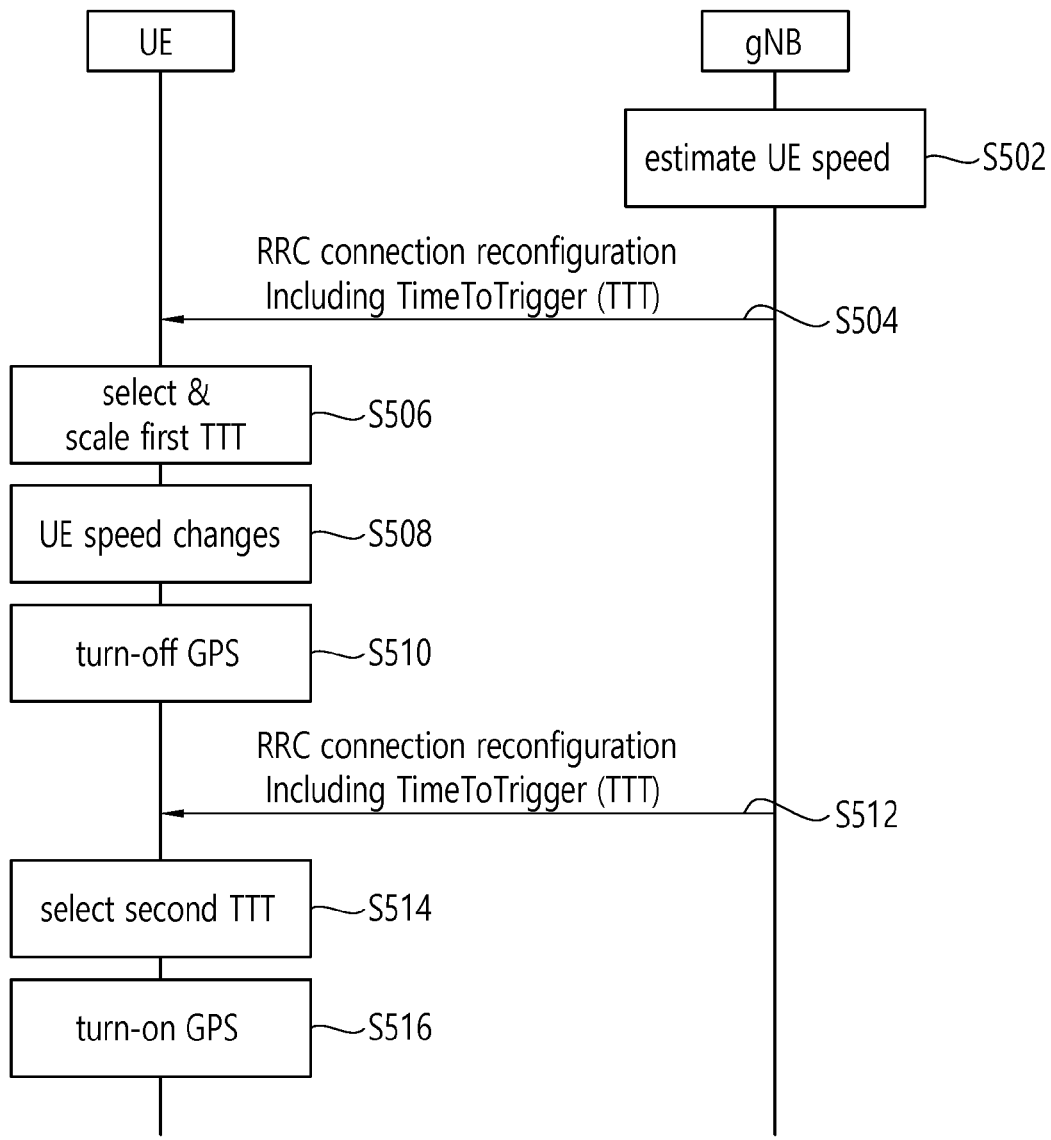
[Fig. 5]

[Fig. 6]
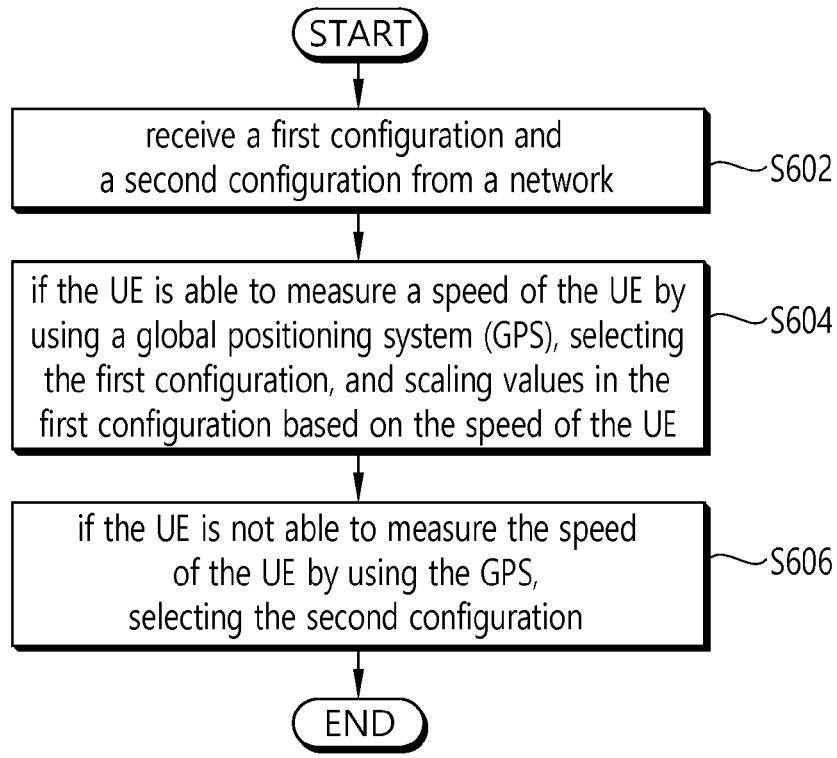
[Fig. 7]
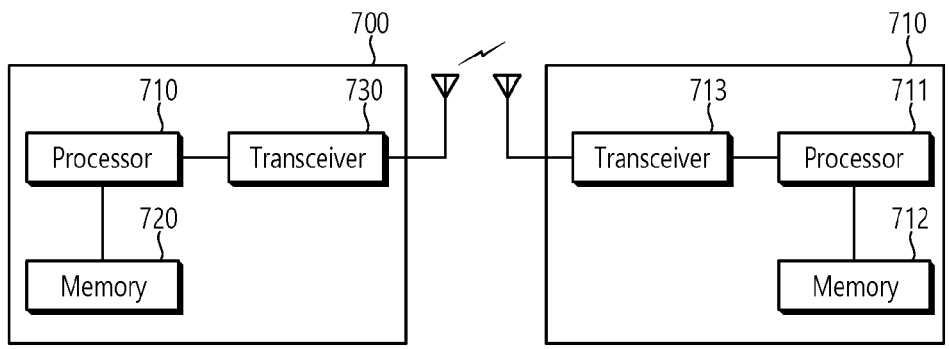

METHOD FOR SELECTING CONFIGURATION BASED ON UE SPEED AND DEVICE SUPPORTING THE SAME

CROSS-REFERENCE TO RELATED APPLICATIONS

This application is the National Stage filing under 35 U.S.C. 371 of International Application No. PCT/KR2018/009059, filed on Aug. 9, 2018, which claims the benefit of U.S. Provisional Application No. 62/543,413, filed on Aug. 10, 2017, the contents of which are all hereby incorporated by reference herein in their entirety.

BACKGROUND OF THE INVENTION

Field of the Invention

The present invention relates to a wireless communication system, and more particularly, to a method for selecting configuration based on UE speed and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, In LTE, whenever serving cell changes, UE may store previous cell identifier and time spent in the cell, and may report them to eNB upon entering RRC CONNECTED mode. Based on this, the eNB may estimate UE speed and set parameters to suit the estimated UE speed for each UE in RRC CONNECTED.

SUMMARY OF THE INVENTION

According to a prior art, if UE speed continues to increase after entering a cell, there will be a large gap between actual UE speed and the speed estimated by gNB when the mobility related parameter is actually used.

According to one embodiment of the present invention, a method for selecting, by a user equipment (UE), configuration based on UE speed in wireless communication system is provided. The method may comprise: receiving a first configuration and a second configuration from a network; if the UE is able to measure a speed of the UE by using a global positioning system (GPS), selecting the first configuration, and scaling values in the first configuration based on the speed of the UE; and if the UE is not able to measure the speed of the UE by using the GPS, selecting the second configuration.

The first configuration and the second configuration may include values related to time for triggering a measurement reporting.

The method may further comprise: receiving scaling factors related to the first configuration, wherein the scaling factors are configured per speed range from the network.

The scaling values may be multiplying the values in the first configuration and a scaling factor corresponding to the speed of the UE measured by using the GPS.

The method may further comprise: setting the scaled values as time for triggering a measurement reporting, if the UE selects the first configuration.

The method may further comprise: setting values in the second configuration as time for triggering a measurement reporting, if the UE selects the second configuration.

The method may further comprise: measuring the speed of the UE by using the GPS, periodically; and if a scaling factor corresponding to the speed of the UE is changed as the measured speed of the UE changes, re-scaling the values in the first configuration.

According to another embodiment of the present invention, a user equipment (UE) in a wireless communication system is provided. The UE may comprise: a transceiver for transmitting or receiving a radio signal; and a processor coupled to the transceiver, the processor configured to: receive a first configuration and a second configuration from a network; if the UE is able to measure a speed of the UE by using a global positioning system (GPS), select the first configuration, and scaling values in the first configuration based on the speed of the UE; and if the UE is not able to measure the speed of the UE by using the GPS, select the second configuration.

The first configuration and the second configuration may include values related to time for triggering a measurement reporting.

The UE may be further configured to: receive scaling factors related to the first configuration, wherein the scaling factors are configured per speed range from the network.

The UE may be further configured to multiply the values in the first configuration and a scaling factor corresponding to the speed of the UE measured by using the GPS for the scaling values.

The UE may be further configured to: set the scaled values as time for triggering a measurement reporting, if the UE selects the first configuration.

The UE may be further configured to: set values in the second configuration as time for triggering a measurement reporting, if the UE selects the second configuration.

The UE may be further configured to: measure the speed of the UE by using the GPS, periodically; and if a scaling factor corresponding to the speed of the UE is changed as the measured speed of the UE changes, re-scale the values in the first configuration.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows a flow chart of a method for selecting configuration based on UE speed according to an embodiment of the present invention.

FIG. 6 shows a flow chart of a method for selecting configuration based on UE speed according to an embodiment of the present invention.

FIG. 7 shows a communication system to implement an embodiment of the present invention.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

In LTE, whenever serving cell changes, UE may store previous cell identifier and time spent in the cell, and may report them to eNB upon entering RRC_CONNECTED mode. Based on this, the eNB may estimate UE speed and set parameters to suit the estimated UE speed for each UE in RRC_CONNECTED.

Speed dependant scaling of measurement related parameters in LTE is described as below. The UE shall adjust the value of the following parameter configured by the E-UTRAN depending on the UE speed: timeToTrigger. The UE shall apply 3 different levels, which are selected as follows:

The UE shall:
1> perform mobility state detection using the mobility state detection with the following modifications:
2> counting handovers instead of cell reselections;
2> applying the parameter applicable for RRC_CONNECTED as included in speedStatePars within VarMeasConfig;
1> if high mobility state is detected:
2> use the timeToTrigger value multiplied by sf-High within VarMeasConfig;
1> else if medium mobility state is detected:
2> use the timeToTrigger value multiplied by sf-Medium within VarMeasConfig;
1> else:
2> no scaling is applied;

The IE TimeToTrigger specifies the value range used for time to trigger parameter, which concerns the time during which specific criteria for the event needs to be met in order to trigger a measurement report.

The limit of the mobility history is that gNB cannot be aware of the change of UE speed while the UE stays in its coverage. The estimation is done upon handover. The gNB may set the mobility related parameters based on the estimated UE speed, but UE may use the parameter right before the next handover. If UE speed continues to increase after entering a cell, there will be a large gap between actual UE speed and the speed estimated by gNB when the mobility related parameter is actually used. Nevertheless, gNB cannot update the mobility related parameters and this might cause the handover failure.

Hereinafter, a method for selecting configuration based on UE speed according to an embodiment of the present invention is described. According to an embodiment of the present invention, it is recommended to study parameter setting based on application layer information. For example, the vehicle UE would be generally equipped with GPS and able to measure remarkably accurate speed using the GPS. If UE scales configured parameter based on its GPS information just before applying the parameter, a very proper value will be used and it will help to reduce the handover failure rate.

According to an embodiment of the present invention, a network (e.g. gNB) may set two configurations. The configurations may be related to timetotrigger value for measurement reporting. The network may set a first configuration regardless of estimated UE speed. The first configuration may be a default value for the timetotrigger for the measurement reporting. The first configuration may be common to plurality of UEs, because the first configuration does not reflect the UE speed yet. The scaling factors may be provided to the UE along with the first configuration. The network may set a second configuration as appropriate for estimated UE speed. The second configuration may be configured based on a UE speed which is estimated by the network. For example, the network may estimate the UE speed by measuring how often serving cell of the UE is changing. Thus, the second configuration may already reflect the UE speed. The estimated UE speed can be provided to UE along with the second configuration.

The UE may receive the two configurations from the network.

The UE may select one of the two configurations. In specific, the UE may select the first configuration, if the UE is aware of the UE speed which is measured by its own positioning system. For example, if the UE is equipped with positioning system, such as a global positioning system (GPS), then the UE may measure its UE speed by itself. The measured UE speed may not include estimated mobility state based on RAN layer information. On the other hand, the UE may select the second configuration, if the UE may not measure the UE speed by itself.

If the UE selects the first configuration, the UE may scale values included in the first configuration based on its speed and scaling factors. The UE may scale the first configuration by multiplying the values in the first configuration by a scaling factor corresponding to the UE speed. Whenever the scaling factor corresponding to the UE speed changes, the UE may re-scale the first configuration. If the UE select the second configuration, the UE may use values in the second configuration without scaling.

If the GPS becomes unavailable, e.g. GPS power-off, and the UE may not measure its UE speed by itself anymore, the UE may use the latest scaled values until receiving new configuration from network for the value. After that, if GPS becomes available, the UE may measure the UE speed by using the GPS, and the UE may scale the first configuration using the measured UE speed. The UE may use the scaled first configuration for triggering measurement reporting.

FIG. 5 shows a flow chart of a method for selecting configuration based on UE speed according to an embodiment of the present invention.

In step S502, the network may estimate a UE speed. For example, the network mat estimate the UE speed based on how many serving cell changed and how long the UE spent time in each cell.

In step S504, the UE may receive RRC connection reconfiguration message including two TimeToTrigger values from PCell. The two TimeToTrigger values may correspond to the first configuration and second configuration, respectively. For example, the first one may be 320 ms and second may be 256 ms. The scaling factors may be also included in the message. Table 1 shows the scaling factors received with the two TimeToTrigger values.

TABLE 1

| Speed (km/h) | 0~30 | 30~60 | 60~100 | 100~200 |
|---|---|---|---|---|
| Scaling factor | 1 | 0.8 | 0.7 | 0.5 |

In step S506, the UE may select one of the two TimeToTrigger values. According to an embodiment of the present invention, the UE may be equipped with a GPS. The UE may select the first value, because the UE may measure its UE speed using GPS. In this embodiment, the first TimeToTrigger value may be 320 m, and the measured UE speed may be 120 km/h. Further, the scaling factor corresponding to the measured UE speed may be 0.5. With such information, the UE may scale the first TimeToTrigger value as follow: 320 ms*0.5=160 ms. The UE may use the scaled TimeToTrigger value, i.e. 160 ms.

In step S508, the UE speed may be changed. For example, the UE speed may change from 120 km/h to 50 km/h. The scaling factor corresponding to the changed UE speed, 50 km/h, is 0.8. So the UE may re-scales the value based on changed UE speed as follow: 320 ms*0.8=256 ms. The UE may use the re-scaled TimeToTrigger value, i.e. 256 ms.

In step S510, a user may turn off the GPS power. The UE doesn't know its speed anymore. That is, the UE may not measure the UE speed by itself. The UE may use the latest scaled first TimeToTrigger value until receiving new configuration including TimeToTrigger value or until the time when the GPS is turned ON.

In step S512, the UE may receive RRC connection reconfiguration message including new TimeToTrigger values. The new TimeToTrigger values may correspond to the first configuration and the second configuration, respectively. The first configuration may include a first value and the second configuration may include the second value. For example, the first value may be 256 ms and second value may be 160 ms. Table 2 shows the scaling factors received with the new TimeToTrigger values.

TABLE 2

| Speed (km/h) | 0~30 | 30~60 | 60~100 | 100~200 |
|---|---|---|---|---|
| Scaling factor | 1 | 0.8 | 0.7 | 0.5 |

In step S514, the UE may select one of the new TimeToTrigger values. According to an embodiment of the present invention, the UE may select the second TimeToTrigger value, because the UE cannot measure the UE speed by itself. In this embodiment, the UE selected the second TimeToTrigger value, and the UE may use the second TimeToTrigger value, e.g. 160 ms, instantly.

In step S516, the user may turn on the GPS. Upon GPS power-on, the UE may select first value and scale it based on newly measured UE speed.

FIG. 6 shows a flow chart of a method for selecting configuration based on UE speed according to an embodiment of the present invention.

In step S602, the UE may receive a first configuration and a second configuration from a network. The first configuration and the second configuration may include values related to time for triggering a measurement reporting.

In step S604, if the UE is able to measure a speed of the UE by using a global positioning system (GPS), the UE may select the first configuration, and scaling values in the first configuration based on the speed of the UE. The UE may receive scaling factors related to the first configuration, wherein the scaling factors are configured per speed range from the network. The scaling values may be multiplying the values in the first configuration and a scaling factor corresponding to the speed of the UE measured by using the GPS.

In step S606, if the UE is not able to measure the speed of the UE by using the GPS, the UE may select the second configuration.

Further, the UE may set the scaled values as time for measurement reporting, if the UE selects the first configuration. The UE may set values in the second configuration as time for triggering a measurement reporting, if the UE selects the second configuration. The UE may further measuring the speed of the UE by using the GPS, periodically. If a scaling factor corresponding to the speed of the UE is changed as the measured speed of the UE changes, the UE may re-scale the values in the first configuration.

FIG. 7 shows a communication system to implement an embodiment of the present invention.

A UE 700 includes a processor 701, a memory 702, and a transceiver 703. The memory 702 is coupled to the processor 701, and stores a variety of information for driving the processor 701. The transceiver 703 is coupled to the processor 701, and transmits and/or receives a radio signal. The processor 701 implements the proposed functions, procedures, and/or methods. In the aforementioned embodiments, an operation of the first network node may be implemented by the processor 701.

A network node 710 includes a processor 711, a memory 712, and a transceiver 713. The memory 712 is coupled to the processor 711, and stores a variety of information for driving the processor 711. The transceiver 713 is coupled to the processor 711, and transmits and/or receives a radio signal. The processor 711 implements the proposed functions, procedures, and/or methods. In the aforementioned embodiments, an operation of the second network node 710 may be implemented by the processor 711.

The processors 711 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of selecting, by a user equipment (UE), configuration based on UE speed in wireless communication system, the method comprising:
receiving a first configuration and a second configuration from a network;
based on availability of the UE for obtaining a speed of the UE, selecting the first configuration, and scaling values in the first configuration based on the speed of the UE; and
based on unavailability of the UE for obtaining the speed of the UE, selecting the second configuration without scaling values in the second configuration,
wherein, after selecting the first configuration, based on the availability being changed to the unavailability, a latest scaled value of a value in the first configuration is used, and
wherein, after selecting the second configuration, based on the unavailability being changed to the availability, the first configuration is selected and a value scaled based on the speed of the UE is used.

2. The method of claim 1, wherein the first configuration and the second configuration include values related to time for triggering a measurement reporting.

3. The method of claim 1, further comprising:
receiving scaling factors related to the first configuration, wherein the scaling factors are configured per speed range from the network.

4. The method of claim 3, wherein scaling values in the first configuration includes multiplying the values in the first configuration and a scaling factor related to the speed of the UE.

5. The method of claim 1, further comprising:
setting the scaled values as time for triggering a measurement reporting, based on the UE selecting the first configuration.

6. The method of claim 1, further comprising:
setting values in the second configuration, without scaling the values in the second configuration, as time for triggering a measurement reporting, based on the UE selecting the second configuration.

7. The method of claim 1, wherein scaling values in the first configuration comprises:
obtaining the speed of the UE, periodically; and
based on a scaling factor related to the speed of the UE being changed as the obtained speed of the UE changes, re-scaling the values in the first configuration.

8. The method of claim 1, wherein the UE supports at least one of a communication between the UE and at least one other UE, or a communication between the UE and the network, and
wherein at least one of the UE or the at least one other UE is a mobile terminal or a vehicle UE.

9. A user equipment (UE) in a wireless communication system, the UE comprising:
a transceiver for transmitting or receiving a radio signal; and
a processor coupled to the transceiver,
the processor configured to:
receive a first configuration and a second configuration from a network;
based on availability of the UE for obtaining a speed of the UE, select the first configuration, and scale values in the first configuration based on the speed of the UE; and
based on unavailability of the UE for obtaining the speed of the UE, select the second configuration without scaling values in the second configuration,
wherein, after selecting the first configuration, based on the availability being changed to the unavailability, a latest scaled value of a value in the first configuration is used, and
wherein, after selecting the second configuration, based on the unavailability being changed to the availability, the first configuration is selected and a value scaled based on the speed of the UE is used.

10. The UE of claim 9, wherein the first configuration and the second configuration include values related to time for triggering a measurement reporting.

11. The UE of claim 9, wherein the processor is further configured to:
   receive scaling factors related to the first configuration, wherein the scaling factors are configured per speed range from the network.

12. The UE of claim 11, wherein the processor is further configured to scale the values in the first configuration by multiplying the values in the first configuration and a scaling factor related to the speed of the UE.

13. The UE of claim 9, wherein the processor is further configured to:
   set the scaled values as time for triggering a measurement reporting, based on the UE selecting the first configuration.

14. The UE of claim 9, wherein the processor is further configured to:
   set values in the second configuration, without scaling the values in the second configuration, as time for triggering a measurement reporting, based on the UE selecting the second configuration.

15. The UE of claim 9, wherein the processor is further configured to scale the values in the first configuration by:
   obtaining the speed of the UE, periodically; and
   based on a scaling factor related to the speed of the UE being changed as the obtained speed of the UE changes, re-scaling the values in the first configuration.

* * * * *